Sept. 26, 1939. F. R. FORD 2,174,207
CLUTCH AND MOTOR CONTROL FOR DUPLICATING MACHINES
Filed May 25, 1938 4 Sheets-Sheet 1

Frank Ronald Ford
Inventor
Taulmin & Taulmin
Attorneys.

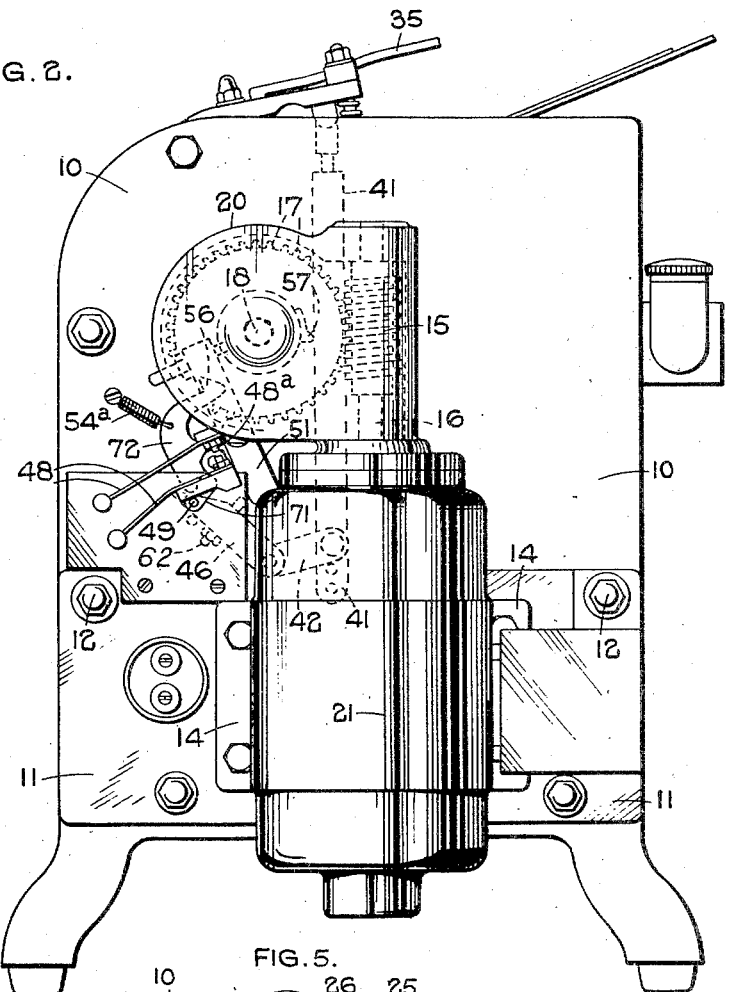

Sept. 26, 1939.   F. R. FORD   2,174,207
CLUTCH AND MOTOR CONTROL FOR DUPLICATING MACHINES
Filed May 25, 1938   4 Sheets—Sheet 3
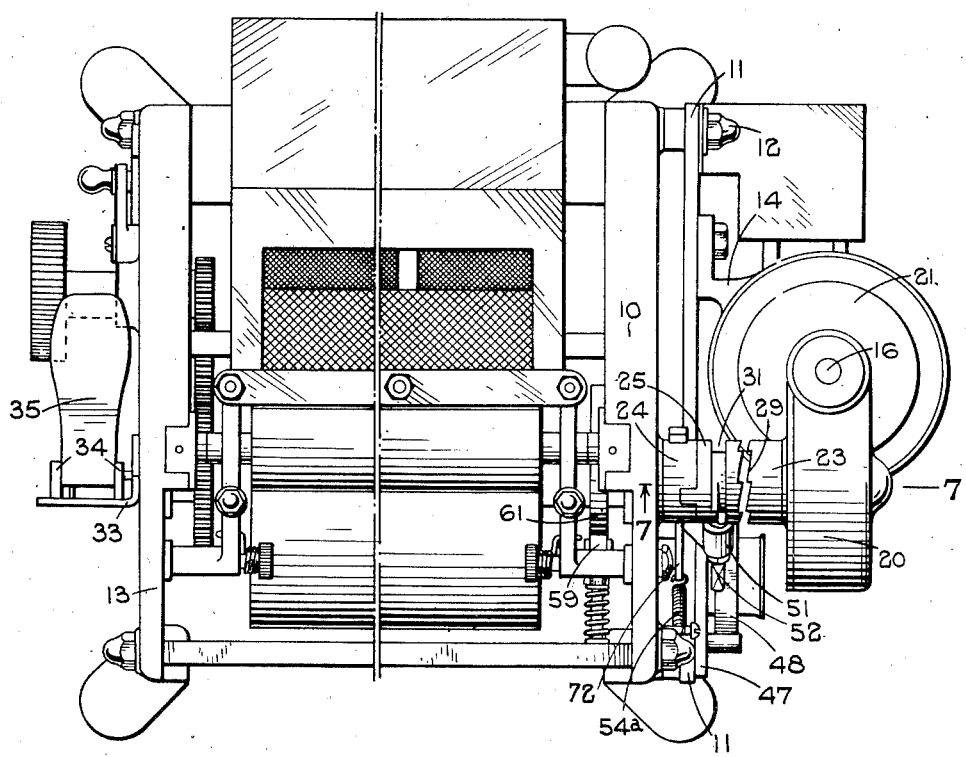
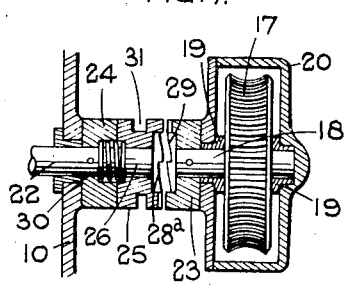
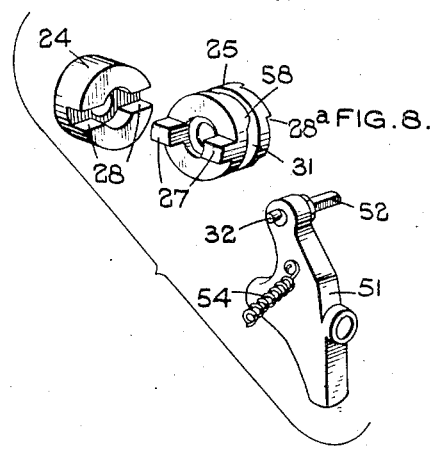
Frank Ronald Ford
Inventor Sept. 26, 1939.  F. R. FORD  2,174,207
CLUTCH AND MOTOR CONTROL FOR DUPLICATING MACHINES
Filed May 25, 1938  4 Sheets-Sheet 4

Frank Ronald Ford
  Inventor
Taulmin & Taulmin
  Attorneys

Patented Sept. 26, 1939

2,174,207

UNITED STATES PATENT OFFICE 2,174,207

CLUTCH AND MOTOR CONTROL FOR DUPLICATING MACHINES

Frank Ronald Ford, Birmingham, England

Application May 25, 1938, Serial No. 210,031
In Great Britain May 31, 1937

8 Claims. (Cl. 192—.02)

This invention relates to machines for duplicating documents, and relates more particularly to power driven rotary reproducing machines, duplicators, printing machines or the like, and has for its object to provide new or improved means for switching the power on and off and for operating a clutch between the power shaft and the driving shaft of the machine.

According to the preesnt invention, the driving shaft of the machine is provided with a clutch adapted to couple the said shaft to a power driven shaft, a switch controlling the current supplied to an electric motor forming the power unit, and a clutch withdrawal device, the clutch withdrawal device and the switch being controlled by an actuating member, which actuating member is adapted to be moved (preferably through the medium of operating mechanism) by the operator into a position which starts the machine running, and being automatically returned to the alternative or "stop" position so that the machine is stopped and the power switched off at the end of each revolution of the machine.

The driving shaft of the machine and the power driven shaft are preferably arranged in alignment, and each is provided with a clutch element, while a third clutch element which is acted upon by a spring and adapted to slide axially, is disposed between the clutch elements on the driving shaft and the power shaft.

The actuating member may be constructed as a lever adapted to be moved into the "start" position and retained in such position by a catch plate, which catch plate is automatically released by a cam on the driving shaft clutch element at or adjacent the end of one revolution.

The clutch withdrawal device may comprise a clutch withdrawal lever having a pin which is moved into a position to engage a cam or incline associated with the sliding clutch member so as to withdraw the clutch from engagement with a clutch element on the power shaft when the machine is to be stopped.

An operating member may be placed on one end plate or frame of the machine, and the controlling and driving gear including the actuating member may be mounted on the other end plate or frame of the machine, and the motion may be transmitted from the operating member to the actuating member by operating mechanism including a spindle extending between the end plates of the machine.

The present invention is particularly applicable to duplicating machines, reproducing machines, printing machines or the like, of the kind having a cylinder to which a master sheet having the matter to be reproduced marked thereon in reverse, is mounted, the machine also having a pressure roller parallel to, and adjacent, the cylinder, and a moistening device by means of which the copy sheets may be moistened, the copy sheets being passed between the pressure roller and the cylinder in contact with the master sheet.

The invention is, however, also applicable to other rotary duplicators, reproducing or printing machines or the like, for instance, stencil machines, metal foil and other printing machines.

The present invention provides a means whereby the machine is power driven, and the machine and motor are automatically stopped after each revolution. If desired, however, the operator can hold the operating member in a certain position, or the operating member can be otherwise retained in such position, to permit of continuous working.

Referring to the drawings:

Figure 2 is a view looking from the opposite end.

Figure 3 is a detail view showing part of the clutch controlling mechanism.

Figure 4 is a detail view showing the switch.

Figure 5 is a detail view showing a part of the clutch controlling mechanism in the position which it occupies when the machine is running.

Figure 6 is a plan view of the machine.

Figure 7 is a section on line 7—7 of Figure 6.

Figure 8 is a perspective view showing two of the clutch parts, and also the clutch withdrawal lever.

Figure 1:
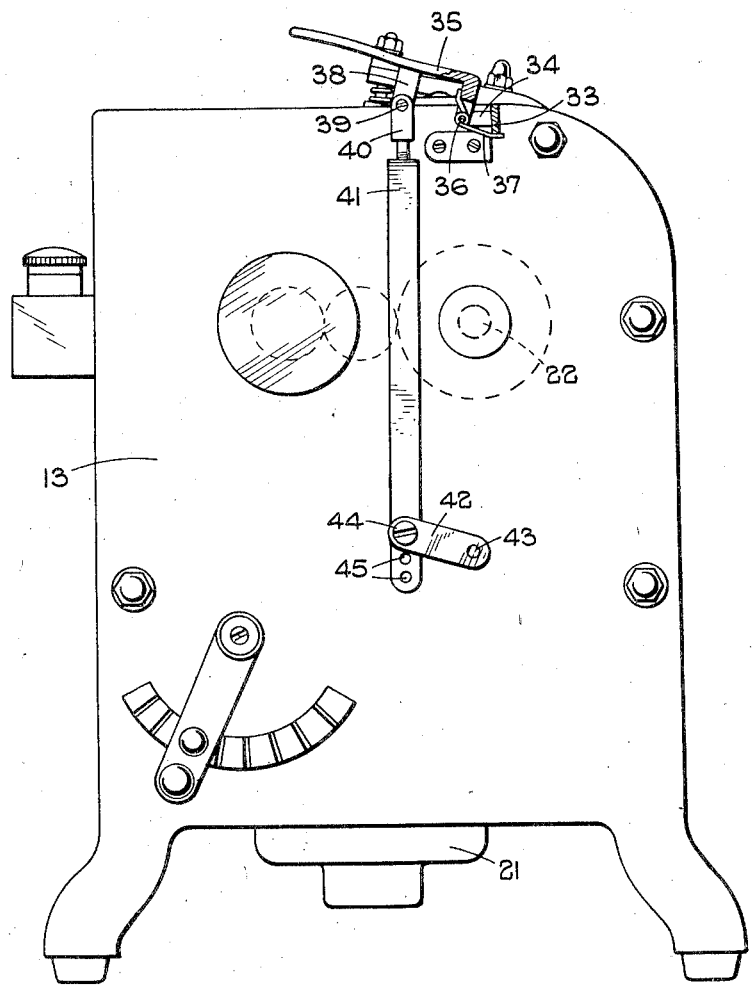
Figure 1 is a view in end elevation showing a rotary duplicating machine to which my invention has been applied.
Figure 9:
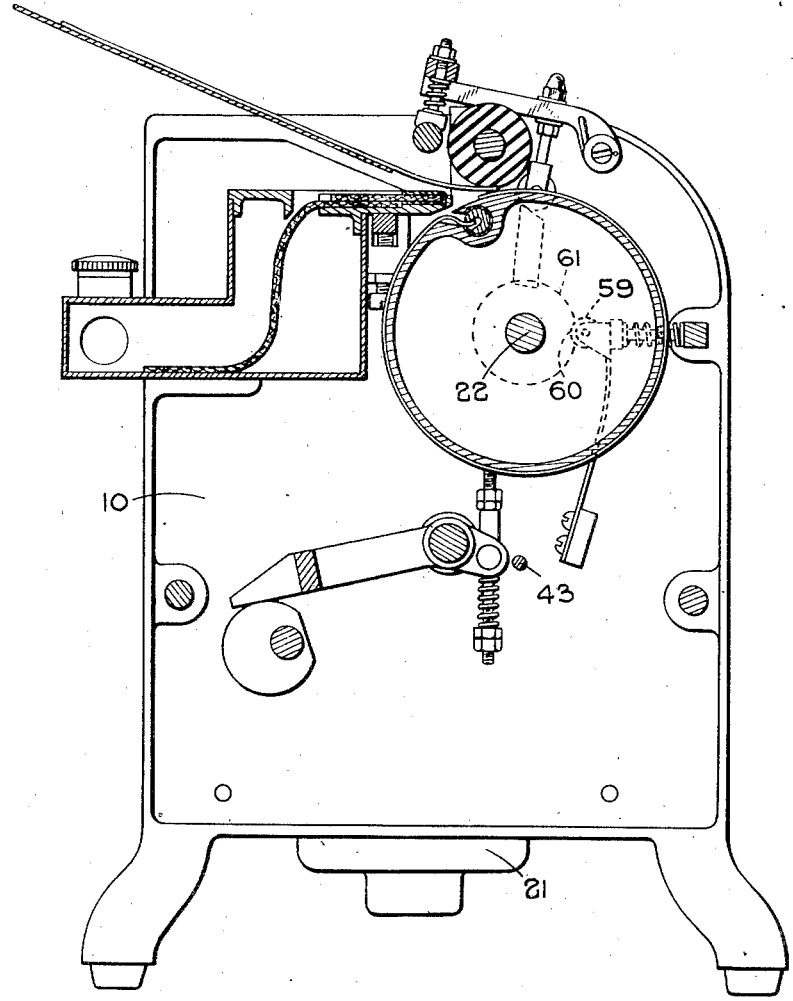
Figure 9 is a sectional view of the machine in end elevation.

In the construction illustrated, on the outer side of one of the end plates 10 of the machine, a plate 11 is provided. This plate is supported upon the projecting ends 12 of the transverse bolts used for attaching the end frames 10 and 13 of the machine together, or by any other method. This plate 11 carries a bracket 14 which is employed for supporting an electric motor 21, and this motor may be placed with its axis vertical as shown, or in any other position. Associated with the motor is worm gearing, the worm 15 being on the motor shaft 16, and the worm wheel 17 being on the shaft 18 which will be designated the power shaft. This power shaft 18 is mounted in bearings 19 supported by a casing 20 mounted on the motor 21 and in line with the driving shaft 22 of the machine, and the power shaft 18 can be coupled thereto by means of the clutch.

The clutch comprises a member 23 fixed on the power shaft 18 and a member 24 fixed on the driving shaft 22 of the machine, and a third member 25 slidably and rotatably mounted upon an extension 26 of the driving shaft of the machine 22. These three clutch members 23, 24, 25, are arranged co-axially, and the sliding clutch member 25 is provided with teeth 27 adapted to engage in slots 28 in the clutch member 24 fixed on the driving shaft 22 of the machine, and at its opposite end the clutch member 25 is provided with ratchet teeth 28a adapted to engage with ratchet teeth 29 on the clutch member 23 fixed on the power shaft 18.

The teeth 27 of the sliding clutch member 25 are always in driving engagement with the slots 28 in the clutch member 24 on the driving shaft of the machine, but the member 25 can be slid in and out of engagement with the clutch member 23 on the power shaft, and a spring 30 is provided urging the member 25 towards the clutch member 23.

The sliding clutch member 25 is provided with a circumferential groove 31, or any other means by which it may be slid, and a pin 32 is provided, hereinafter designated the clutch withdrawal pin, which engages in this groove so as to hold the sliding clutch member out of engagement with the clutch member on the power shaft when the drive is to be stopped.

At the opposite end of the machine and on the outer side of the end plate or frame 13, a bracket 33 is provided having a pair of lugs 34 between which and a centre 36 is pivoted an L shaped lever 35. A spring 37 is provided tending to keep the lever in a raised position. On the underside of the lever is a lug 38 pivoted at 39 to a forked stem 40, the forked stem being attached by a link 41 to a lever 42 mounted upon a spindle 43. The lever 42 is attached to the link 41 by a screw 44 which can be engaged in any one of several holes 45.

The lever 42 is mounted upon the spindle 43 which extends through the machine from one end to the other and projects through both end plates 10 and 13. At that end of the machine where the clutch is provided, this spindle 43 is provided with an actuating member 46 which is in the form of a lever, and it will of course be understood that this lever can be rocked by depressing the operating member 35.

Mounted on a small panel 47 attached to the plate 11 of the machine adjacent to the actuating member 46 are a pair of spring arms 48 carrying contact members 48a which constitute a switch. Normally these spring contact members are disposed out of engagement. When the operating lever 35 is depressed, a pin 49 on the actuating lever 46, which pin projects through a slot 71 in the plate 47, engages behind one of the spring contacts 48 and moves it into contact with the other, so as to complete a circuit and start the motor.

Pivotally mounted at 50 on the plate 10 is a clutch withdrawal lever 51 having the pin 32 which may be adjustable by having its end formed eccentrically in relation to its shank 52. This pin 32 is the clutch withdrawal pin, and in one position of the clutch withdrawal lever, it engages in the circumferential groove 31 of the sliding clutch member 25 and holds this sliding member back against the pressure of the clutch spring 30 and prevents it from moving into engagement with the clutch member 23 on the power shaft. A spring 54 is preferably provided tending to retain the clutch withdrawal lever in this position.

When the clutch withdrawal lever 51 is rocked, however, the clutch withdrawal pin 32 is withdrawn from the groove 31, so that the sliding clutch member 25 can then move into engagement with the clutch member 23 on the power shaft.

The clutch withdrawal lever 51 is rocked by reason of the fact that one of its arms is engaged by an adjustable screw 62 in the actuating lever 46 so that movement of this lever is imparted to the lever 51.

Thus when the operating lever 35 is depressed, the contacts 48a are moved into engagement with each other, and the clutch withdrawal pin 32 is actuated to allow the clutch member 25 to engage the clutch member 23 substantially simultaneously.

Pivoted at 53 on the end plate 10 adjacent the actuating lever 46 is a catch plate 72 acted upon by a spring 54a and having a shoulder or hook 55 at one end adapted to engage the actuating lever 46 so as to retain it in the position into which it is moved when the machine is started. The opposite end 56 of this catch plate is situated adjacent the clutch member 24 fixed on the driving shaft of the machine, and on the periphery of this clutch member is placed a small block 57 forming a cam, the arrangement being such that at a predetermined moment in the cycle of operations, this cam 57 engages the catch plate 72 and rocks it against spring pressure so as to release the actuating lever 46 which then moves back to its initial or "stop" position under the influence of the spring associated with the operating member. When this occurs, the contacts 48a forming the switch are separated so that the motor is stopped, and the clutch withdrawal pin 32 moves again into the groove 31 of the sliding clutch member 25 and engages an incline 58 on one side of the groove, causing the sliding clutch member to move out of engagement with the clutch member 23 on the power shaft 18. The machine is positively stopped at the end of the revolution by reason of the usual spring-pressed plunger 59 adapted to engage in a notch 60 on a disc 61 on the driving shaft 22 at the end of the revolution for registration purposes. If the machine is not so provided, then such provision will be made in accordance with this invention.

What I claim then is:

1. Driving gear for rotary duplicating machines, comprising a machine driving shaft, a power driven shaft, an electric motor connected to the power driven shaft, a switch for controlling current to the motor, a clutch member fixed on the power driven shaft, a second clutch member in driving connection with the machine driving shaft and slidable thereon into or out of engagement with the first clutch member, a spring acting on the sliding clutch member urging it towards the clutch member on the power driven shaft, said sliding clutch member having a peripheral shoulder, and the clutch withdrawal device having a pin moving in and out of engagement with said shoulder, said shoulder having an incline which at the end of each revolution of the machine driving shaft engages said pin so as to withdraw said sliding clutch member from engagement with the clutch member fixed on the power driven shaft.

2. Driving gear for rotary duplicating machines, comprising a machine driving shaft, a power driven shaft, means for coupling the power driven shaft to the machine driving shaft, an electric motor connected to the power driven shaft, a switch for controlling current to the motor, a single actuating member for controlling both the coupling means and the switch, a catch plate for holding the actuating member in the position into which it is moved to start the machine, and a cam rotating with the machine driving shaft for releasing the catch plate from the actuating member.

3. Driving gear for rotary duplicating machines, comprising a machine driving shaft, a power driven shaft, an electric motor connected to the power driven shaft, a switch for controlling current to the motor, a clutch member fixed on the power driven shaft, a second clutch member in driving connection with the machine driving shaft and slidable thereon into or out of engagement with the first clutch member, an actuating device lever, a transversely projecting pin carried by the actuating lever and adapted to operate the switch, a clutch withdrawal device lever pivoted intermediate its ends, means on the actuating lever adapted to engage one end of the clutch withdrawal lever, and a pin on the other end of the clutch withdrawal lever adapted to engage the sliding clutch member.

4. Driving gear for rotary duplicating machines, comprising a machine driving shaft, a power driven shaft, an electric motor connected to the power driven shaft, a switch for controlling current to the motor, a clutch member fixed on the power driven shaft, a second clutch member in driving connection with the machine driving shaft and slidable thereon into or out of engagement with the first clutch member, a clutch withdrawal device lever, a pin having a shank rotatably engaging in said lever, said pin also having an end portion adapted to engage the sliding clutch member, said end portion being eccentric in relation to the axis of the shank and an actuating member controlling both the switch and the clutch withdrawal lever.

5. Driving gear for rotary duplicating machines comprising an operating member, operating mechanism mechanically connecting said operating member to an actuating lever, a machine driving shaft, a power driven shaft, clutch elements fixed one on the driving shaft of the machine and one on the power driven shaft, said shafts being in line, a sliding clutch element always engaging the clutch element on the machine driving shaft and urged by a spring towards the clutch element on the power driven shaft, a peripheral groove in said sliding clutch element, an incline on one side of said groove, a clutch withdrawal lever adapted to be rocked by the actuating lever, a pin on said clutch withdrawal lever adapted to engage in said groove and to engage said incline to produce axial sliding movement of the sliding clutch element to disengage it from the clutch element on the power driven shaft, said pin being releasable from the groove when the clutch withdrawal lever is rocked by the actuating member, and a catch plate for holding the actuating lever in the position which it occupies when it has rocked the clutch withdrawal lever, said catch plate being automatically released from the actuating lever by a cam.

6. Driving gear according to claim 5, comprising an operating lever pivoted to one of the machine end plates, a spindle extending through the machine from side to side and through both the end plates of the machine, a lever on the spindle at the outer side of the end plate upon which the operating member is pivoted, and a link connecting this lever to the operating lever, the actuating lever being fixed on the opposite end of said spindle.

7. Driving gear according to claim 5, comprising a plate attached on the outer side but spaced away from one of the end plates of the machine, a bracket on said plate supporting an electric motor, a casing mounted on the motor and containing reducing gear, said casing also having bearings supporting the power driven shaft.

8. Driving gear according to claim 5, comprising a plate attached on the outer side but spaced away from one of the end plates of the machine, a panel attached to said plate, said panel having a slot, contact members fixed on the outer side of said panel, one of said contact members being mounted on a spring arm, an actuating lever pivoted on the machine end plate and having a laterally projecting pin extending through said slot and engaging the contact member mounted on the spring arm.

FRANK RONALD FORD.